United States Patent
Liu et al.

(10) Patent No.: US 9,008,048 B2
(45) Date of Patent: Apr. 14, 2015

(54) METHOD FOR CONTROLLING UPLINK TRANSMISSION IN A MANAGEMENT DEVICE OF LTE-A NETWORK AND THE DEVICE THEREOF

(75) Inventors: Jin Liu, PuDong Jinqiao Shanghai (CN); Mingli You, PuDong Jinqiao Shanghai (CN); Zhihua Hou, PuDong Jinqiao Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 302 days.

(21) Appl. No.: 13/703,450

(22) PCT Filed: Mar. 25, 2011

(86) PCT No.: PCT/IB2011/000930
§ 371 (c)(1),
(2), (4) Date: Dec. 11, 2012

(87) PCT Pub. No.: WO2011/161500
PCT Pub. Date: Dec. 29, 2011

(65) Prior Publication Data
US 2013/0089078 A1 Apr. 11, 2013

(30) Foreign Application Priority Data
Jun. 20, 2010 (CN) .......................... 2010 1 0210063

(51) Int. Cl.
*H04W 72/04* (2009.01)
*H04L 1/18* (2006.01)

(52) U.S. Cl.
CPC ........... *H04W 72/042* (2013.01); *H04L 1/1819* (2013.01); *H04L 1/1896* (2013.01)

(58) Field of Classification Search
CPC .. C12Q 1/6895; H04L 1/1819; H04L 1/1896; H04W 72/042
USPC ............................ 370/329, 335, 338; 714/748
See application file for complete search history.

(56) References Cited

U.S. PATENT DOCUMENTS

2010/0111226 A1* 5/2010 Ko et al. ....................... 375/299
2010/0115358 A1* 5/2010 Kotecha et al. ............... 714/748

(Continued)

FOREIGN PATENT DOCUMENTS

| EP | 2 086 145 A2 | 8/2009 |
|---|---|---|
| JP | 2012-507943 | 3/2012 |
| WO | 2010/051209 | 5/2010 |

OTHER PUBLICATIONS

Texas Instruments, "Transmission Modes and Signaling for UL MIMO," 3$^{rd}$ Generation Partnership Project (3GPP), 3GPP TSG RAN WG1 61, R1-102826, XP050419987, pp. 1-5, Montreal, Canada, 10-14 2010.

(Continued)

*Primary Examiner* — Andrew Lai
*Assistant Examiner* — Mahmudul Hasan
(74) *Attorney, Agent, or Firm* — Fay Sharpe LLP

(57) ABSTRACT

According to embodiments of the present invention, there is provided a method of providing, for a dual-antenna UE or quadri-antenna UE, downlink control information used for uplink transmission in a management device of LTE-A network, and the method for the former comprises the steps of: determining an uplink transmission scheme for the dual-antenna UE; semi-statically configuring, by high level signaling, the uplink transmission mode to which the uplink transmission scheme belongs; generating downlink control information corresponding to the determined uplink transmission scheme, the downlink control information comprising a first indicating field, a second indicating field, a new-data indicating field for a first transmission block and a new-data indicating field for a second transmission block; wherein, when transmission block is disabled for the determined up-link transmission scheme, disablement of at least one of two transmission blocks is represented by a first combination of the value of the first indicating field and the second indicating field; and the disablement of the two transmission blocks is represented by a combination formed by the new-data indicating field for the first transmission block and the new-data indicating field for the second transmission block; transmitting the generated downlink control information to the dual-antenna UE.

15 Claims, 4 Drawing Sheets

(56) References Cited

U.S. PATENT DOCUMENTS

| | | | | |
|---|---|---|---|---|
| 2010/0284379 | A1* | 11/2010 | Bitran et al. | 370/338 |
| 2010/0302960 | A1* | 12/2010 | Bjorken et al. | 370/252 |
| 2011/0141941 | A1* | 6/2011 | Lee et al. | 370/252 |
| 2011/0176629 | A1* | 7/2011 | Bayesteh et al. | 375/267 |
| 2011/0222485 | A1* | 9/2011 | Nangia et al. | 370/329 |
| 2011/0310853 | A1* | 12/2011 | Yin et al. | 370/335 |
| 2012/0044894 | A1* | 2/2012 | Ko et al. | 370/329 |
| 2012/0057547 | A1* | 3/2012 | Lohr et al. | 370/329 |

OTHER PUBLICATIONS

Motorola, "Control Signaling for Enhanced DL transmission for LTE," $3^{rd}$ Generation Partnership Project (3GPP), 3GPP TSG RAN WG1 #57, R1-091933, XP050339412, pp. 1-10, San Francisco, USA, May 4-8, 2009.

Motorola, "Control Signaling for LTE Rel-9 Enhanced DL transmission," $3^{rd}$ Generation Partnership Project (3GPP), 3GPP TSG RAN WG1 #58bis, R1-093955, XP050388454, pp. 1-5, Miyazaki, Japan, Oct. 12-16, 2009.

Alcatel-Lucent Shanghai Bell et al., "Further Discussions on UL Transmission Modes and DCI Format Designs," $3^{rd}$ Generation Partnership Project (3GPP), 3GPP TSG RAN WG1 Meeting #61bis, R1-104092, XP050449626, pp. 1-8, Dresden, Germany, Jun. 28-Jul. 2, 2010.

Alcatel-Lucent Shanghai Bell et al., "DCI Format Design for LTE-A PUSCH Transmission," $3^{rd}$ Generation Partnership Project (3GPP), 3GPP TSG RAN WG1 Meeting #60, R1-100938, XP050418535, pp. 1-7, San Francisco, CA, Feb. 22-26, 2010.

Alcatel-Lucent Shanghai Bell et al., "UL Transmission Modes for LTE-A PUSCH Transmission," $3^{rd}$ Generation Partnership Project (3GPP), 3GPP TSG RAN WG1 Meeting #61, R1-102794, XP050419967, pp. 1-5, Montreal, Canada, May 10-14, 2010.

International Search Report for PCT/IB2011/000930 dated Apr. 19, 2012.

LG Electronics, "UL Transmission Mode and Control Signaling in LTE-A," 3GPP TSG RAN WG1 Meeting #61, Montreal, Canada, May 10-14, 2010, R1-102726, pp. 1-4.

Samsung, "PMI signaling in DCI format for UL MIMO," 3GPP TSG RAN WG1 meeting #61, Montreal, Canada, May 4-10, 2010, R1-103034, p. 1-4.

Samsung, "Further Discussions on UL MIMO Signaling requirements," 3GPP TSG RAN WG1 #61, Montreal, Canada, May 10-14, 2010, R1-103033, pp. 13-18.

\* cited by examiner

METHOD FOR CONTROLLING UPLINK TRANSMISSION IN A MANAGEMENT DEVICE OF LTE-A NETWORK AND THE DEVICE THEREOF

FIELD OF THE INVENTION

The present invention relates to control for uplink transmission of UE (User Equipment), more particularly to a method for controlling uplink transmission in a management device of LTE-A network and the device thereof.

BACKGROUND OF THE INVENTION

To support the new features of UL SU-MIMO, non-contiguous resource allocation (RA) and carrier aggregation (CA) in LTE-A Rel-10, UL transmission mode needs to be determined and the downlink control information format (DCI format) for UL grant needs to be designed, and control signaling overhead and blind decoding complexity is particularly involved therein.

In latest standardization meetings, in terms of the above three features, consensus is agreed as follows:

1. DL/UL transmission mode can be configured independently.
2. about non-contiguous RA
 Frequency hopping is not supported simultaneously with non-contiguous PUSCH resource allocation;
 Support dynamic switching between Rel-8 single cluster transmission and Rel-10 multi-cluster PUSCH transmission;
 No additional blind decodings to support non-contiguous UL RA in single antenna transmission case
 "No additional blind decodings to support non-contiguous UL RA" also applies to SU-MIMO case if SU-MIMO is supported with non-contiguous UL RA.
3. About CA
 CIF is not included in DCI format 0, 1A in common search space when CRC is scrambled by C-RNTI/SPS C-RNTI;
 Cross carrier scheduling for DCI format 0, 1, 1A, 1B, 1D, 2, 2A, 2B in UE specific search space should be supported by explicit CIF always, wherein DCI format 0 for UL grant, and other DCI format for indicating the DCI format of control information used when UE receiving downlink signal.
4. about UL SU-MIMO
 At least two new Rel-10 UE-specific RRC-configured transmission modes for PUSCH of UE with multiple Antenna Ports(AP):
 Single-antenna port mode;
 Multi-antenna port mode supporting up to 2 Transport Block(TB), wherein, the number of antenna ports depends on the UE capability;
 FFS whether or not a third RRC-configured multi-antenna transmission mode is needed.
 For PUSCH, a dynamic switching between the configured transmission scheme and a single-port fallback scheme with the same DCI format for all RRC configured modes;
 2NDI and 2A/N are needed for up to 2TBs;
 Reuse the CW (codeword)-to-layer mapping principle as in LTE Rel-8 DL spatial multiplexing;
 For 2-Tx, 3-bit precoding codebook(CB) is specified, wherein:
 Size-6 CB for rank-1 precoding;
 1 identity matrix for rank-2 (namely full-rank) precoding;
 For 4-Tx, 6-bit precoding codebook is specified, wherein:
 Size-24 CB for rank-1 precoding;
 Size-16 CB for rank-2 precoding;
 Size-12 CB for rank-3 precoding;
 1 identity matrix for rank-4 (namely full-rank) precoding;
 Other related issues
 Dynamic aperiodic SRS is supported;
 CS separation is the primary multiplexing scheme of DM RS;
 OCC separation between slots may be used as complementary multiplexing scheme of DMRS, where the OCC index is implicitly derived.

SUMMARY OF THE INVENTION

At least one embodiment of the present invention originates from realizing of technical problem in the prior art, specifically, such technical problems may directly impact DCI format design for UL grant, which is needed to be further designed and determined particularly:

Whether to support multiple clusters (more than 2);
Whether to support per-antenna/per-CW UL power control using multiple TPC commands;
Whether to support dynamic CS configuration for multiple layers via explicit signaling;
How to implement TB (transmission block) disabling function so as to support dynamic rank adaptation.

In R1-102826, titled as "Transmission Modes and Signaling for UL MIMO", there is provided a current DCI format of UL grant, as shown in Table 1.

In Table 1, the scenario of contiguous RA is taken as an example.

As for the above technical problem in the prior art, according to at least one embodiment of the present invention, there is provided a new uplink transmission mode and UL grant DCI format,

TABLE 1

DCI format for UL grants. The differences due to UL SU-MIMO are highlighted, assume contiguous RA

| Field | Format 0 (single-antenna) | | Format 4 (multi-antenna up to 2TB) | | Format 4A (multi-antenna 1-layer) | |
|---|---|---|---|---|---|---|
| | 5 MHz | 20 MHz | 5 MHz | 20 MHz | 5 MHz | 20 MHz |
| Format flag | 1 | 1 | 1 | 1 | 1 | 1 |
| Hopping flag | 1 | 1 | 1 | 1 | 1 | 1 |
| RB assignment: | 9 | 13 | 9 | 13 | 9 | 13 |
| MCS-RV for CW0 | 5 | 5 | 5 | 5 | 5 | 5 |

TABLE 1-continued

DCI format for UL grants. The differences due to UL SU-MIMO are highlighted, assume contiguous RA

| Field | Format 0 (single-antenna) | | Format 4 (multi-antenna up to 2TB) | | Format 4A (multi-antenna 1-layer) | |
|---|---|---|---|---|---|---|
| | 5 MHz | 20 MHz | 5 MHz | 20 MHz | 5 MHz | 20 MHz |
| New Data Indicator for CW0 | 1 | 1 | 1 | 1 | 1 | 1 |
| MCS-RV for CW1 | — | — | 5 | 5 | — | — |
| New Data Indicator for CW1 | — | — | 1 | 1 | — | — |
| TB-to-CW swap flag | — | — | 1 | 1 | — | — |
| TPC | 2 | 2 | 2 | 2 | 2 | 2 |
| Cyclic shift for DMRS | 3 | 3 | $3^1$ | $3^1$ | $3^1$ | $3^1$ |
| CQI request | 1 | 1 | 1 | 1 | 1 | 1 |
| UL index (TDD only) | 2 | 2 | 2 | 2 | 2 | 2 |
| RNTI / CRC | 16 | 16 | 16 | 16 | 16 | 16 |
| Precoding information (TPMI + TRI) (2 or 4-Tx) | — | — | 3 (2Tx) or 6 (4Tx) | 3 (2Tx) or 6 (4Tx) | 3 (2Tx) or 5 (4Tx) | 3 (2Tx) or 5 (4Tx) | with aforesaid latest agreement taken into account, and size of the new DCI format is optimized. Advantageously, there is also provided a transmission block disabling scheme, such that dynamic rank adaptation and 1-CW retransmission are supported.

Correspondingly, according to configured uplink transmission mode, UE blindly detects and searches, in common search space and the UE-specific search space, downlink control information format corresponding to such transmission mode with a limited number, and conducts UL transmission based on the decoded downlink control information.

According to an embodiment of the present invention, there is provided a method of providing, for a dual-antenna UE, downlink control information used for uplink transmission in a management device of enhanced LTE network, comprising the steps of: determining an uplink transmission scheme for the dual-antenna UE; semi-statically configuring, by high level signaling, the uplink transmission mode to which the uplink transmission scheme belongs; generating downlink control information corresponding to the determined uplink transmission scheme, the downlink control information comprising a first indicating field, a second indicating field, a new-data indicating field for a first transmission block and a new-data indicating field for a second transmission block; wherein, when transmission block disabling function is adopted in the determined uplink transmission scheme, disablement of at least one of two transmission blocks is represented by a first combination of the values of the first indicating field and the second indicating field; and the disabled transmission block of the two transmission blocks is represented by a combination formed by the new-data indicating field for the first transmission block and the new-data indicating field for the second transmission block; transmitting the generated downlink control information to the dual-antenna UE.

According to another embodiment of the present invention, there is provided a method of providing, for a multi-antenna UE, downlink control information used for uplink transmission in a management device of LTE-A network, comprising the steps of: determining an uplink transmission scheme for the multi-antenna UE; semi-statically configuring, by high level signaling, the uplink transmission mode to which the uplink transmission scheme belongs; generating downlink control information corresponding to the determined uplink transmission scheme, the downlink control information comprising a precoding matrix indicating field, and further comprising a new-data indicating field for a first transmission block and a new-data indicating field for a second transmission block; wherein, when transmission block is disabled for the determined uplink transmission scheme, disablement of at least one of two transmission blocks is represented by a first value of the precoding matrix indicating field; and the disabled transmission block of the two transmission blocks is represented by a combination of the new-data indicating field for the first transmission block and the new-data indicating field for the second transmission block; the downlink control information further comprises respective redundant version fields of modulation-coding modes of the two transmission blocks, wherein, the redundant version field of modulation-coding mode of the disabled transmission block is utilized to represent the pre-coding matrix information of channel coding codeword which is mapped by the transmission block without being disabled; transmitting the generated downlink control information to the multi-antenna UE.

Furthermore, to support more denotation of precoding matrix, the downlink control information further comprises a TB-codeword mapping indicating field, for representing, collaboratively with the redundant version field of modulation-coding mode of the disabled transmission block, the precoding matrix information of channel coding codeword which is mapped by the transmission block without being disabled.

According to another embodiment of the present invention, there is provided a method of providing, for a dual-antenna UE, downlink control information used for uplink transmission in a management device of LTE-A network, comprising the steps of: determining an uplink transmission scheme for the dual-antenna UE; semi-statically configuring, by high level signaling, the uplink transmission mode to which the uplink transmission scheme belongs; generating downlink control information corresponding to the determined uplink transmission scheme, wherein, when the uplink transmission scheme is of a closed-loop spatial multiplexing transmission with up to two codewords, the downlink control information comprising: a Resource Block assignment and hopping information field; a transmission block disabling indicating field; a TB-codeword mapping indicating field; a redundant version field of modulation-coding mode of every transmission block; a new-data indicating field of every transmission block; a transmission power control field; a cycle shift field for demodulation reference signal corresponding to a first channel coding codeword; a CQI request field; a SRS request field; a CIF field; an UL index (TDD only) field; a CRC field; transmitting the generated downlink control information to the dual-antenna UE.

According to still another embodiment of the present invention, there is provided a method of providing, for a multi-antenna UE, downlink control information used for uplink transmission in a management device of LTE-A network, comprising the steps of: determining an uplink transmission scheme for the multi-antenna UE; semi-statically configuring, by high level signaling, the uplink transmission mode to which the uplink transmission scheme belongs; generating downlink control information corresponding to the determined uplink transmission scheme, wherein, when the uplink transmission scheme is of a closed-loop spatial multiplexing transmission with up to two codewords, the downlink control information comprising: a Resource Block assignment and hopping information field; a precoding matrix indicating field; a TB-codeword mapping indicating field; a redundant version field of modulation-coding mode of every transmission block; a new-data indicating field of every transmission block; a transmission power control field; a field of cycle shift for demodulation reference signal corresponding to a first channel coding codeword; a CQI request field; a SRS request field; a CIF field; an UL index (TDD only) field; a CRC field; transmitting the generated downlink control information to the multi-antenna UE.

According to yet another embodiment of the present invention, there is provided a method of providing, for a multi-antenna UE, downlink control information used for uplink transmission in a management device of LTE-A network, comprising the steps of: determining an uplink transmission scheme for the multi-antenna UE; semi-statically configuring, by high level signaling, the uplink transmission mode to which the uplink transmission scheme belongs; generating downlink control information corresponding to the determined uplink transmission scheme, wherein, when the uplink transmission scheme is of a closed-loop spatial multiplexing transmission with single layer, the downlink control information comprising: a Resource Block assignment and hopping information field; a precoding matrix indicating field; a redundant version field of modulation-coding mode of transmission block; a new-data indicating field of transmission block; a transmission power control field; a field of cycle shift for demodulation reference signal corresponding to a channel coding codeword; a CQI request field; a SRS request field; a CIF field; an UL index (TDD only) field; a CRC field; transmitting the generated downlink control information to the multi-antenna UE.

According to yet another embodiment of the present invention, there is provided a method of controlling uplink transmission of a UE in a management device of LTE-A network, wherein, the method comprises the steps of: predetermining three uplink transmission modes for the UE, the three uplink transmission mode comprises a first uplink transmission mode, a second uplink transmission mode and a third uplink transmission mode, wherein: the first uplink transmission mode corresponds to transmission of single-antenna port; the second uplink transmission mode corresponds to transmission of single-antenna port or closed-loop spatial multiplexing transmission with up to two codewords; the third uplink transmission mode corresponds to transmission of single-antenna port or closed-loop spatial multiplexing transmission with single layer; when the UE is a dual-antenna UE, the downlink control information provided for closed-loop spatial multiplexing transmission with up to two codewords to be conducted by the UE has a format as aforesaid; or when the UE is a multi-antenna UE other than dual-antenna UE, the downlink control information provided for closed-loop spatial multiplexing transmission with up to two codewords to be conducted by the UE has a downlink control information format as aforesaid.

According to yet another embodiment of the present invention, there is provided a first device of providing, for a dual-antenna UE, downlink control information used for uplink transmission in a management device of LTE-A network, comprising: a first unit for determining an uplink transmission scheme for the dual-antenna UE; a second unit for semi-statically configuring, by high level signaling, the uplink transmission mode to which the uplink transmission scheme belongs; a third unit for generating downlink control information corresponding to the determined uplink transmission scheme, the downlink control information comprising a first indicating field, a second indicating field, a new-data indicating field for a first transmission block and a new-data indicating field for a second transmission block; wherein, when transmission block disabling function is adopted in said determined uplink transmission scheme, disablement of at least one of two transmission blocks is represented by a first combination of the values of the first indicating field and the second indicating field; and the disabled transmission block of the two transmission blocks is represented by a combination formed by the new-data indicating field for the first transmission block and the new-data indicating field for the second transmission block; a first transmitting device for transmitting the generated downlink control information to the dual-antenna UE.

According to yet another embodiment of the present invention, there is provided a second device of providing, for a quadri-antenna UE, downlink control information used for uplink transmission in a management device of LTE-A network, comprising: a fourth unit for determining an uplink transmission scheme for the quadri-antenna UE; a fifth unit for semi-statically configuring, by high level signaling, the uplink transmission mode to which the uplink transmission scheme belongs; a sixth unit for generating downlink control information corresponding to the determined uplink transmission scheme, the downlink control information comprising a precoding matrix indicating field, and further comprising a new-data indicating field for a first transmission block and a new-data indicating field for a second transmission block; wherein, when transmission block disabling function is adopted in said determined uplink transmission scheme, disablement of at least one of two transmission blocks is represented by a first value of the precoding matrix indicating field; and the disabled transmission block of the two transmission blocks is represented by a combination of the new-data indicating field for the first transmission block and the new-data indicating field for the second transmission block; the downlink control information further comprises respective redundant version fields of modulation-coding modes of the two transmission blocks, wherein, the redundant version field of modulation-coding mode of the disabled transmission block represents the pre-coding matrix of channel coding codeword which is mapped by the transmission block without being disabled; a second transmitting device for transmitting the generated downlink control information to the multi-antenna UE.

Moreover, to support more types of denotation of precoding matrix, the downlink control information further comprises a TB-codeword mapping indicating field, for representing, collaboratively with the redundant version field of modulation-coding mode of the disabled transmission block, the pre-coding matrix information of channel coding codeword which is mapped by the transmission block without being disabled.

As compared with the prior art, according to embodiments of the present invention, there is provided uplink transmission mode and downlink control information format for uplink grant, for dual-antenna and quadri-antenna UE and the scenario with more antennas, wherein, signalling overhead and blind decoding complexity is effectively controlled. Additionally, transmission block disabling and one-codeword retransmission scheme is effectively implemented.

BRIEF DESCRIPTION OF THE DRAWINGS

Features, aspects and advantages of the present invention will become more obvious by reading the following description of non-limiting embodiments with the aid of appended drawings.

Wherein, same or similar reference numerals refer to the same or similar device(module) or step of method.

DETAILED DESCRIPTION OF EMBODIMENTS

At least one embodiment of the method and device of present invention as shown in figures would be recited hereafter. It should be appreciated that, such embodiments are set forth by explanation of every aspect of the present invention, rather than being interpreted as a limitation to the present invention. For instance, portions of feature represented or recited as one embodiment may be used in another embodiment, thereby rendering another embodiment. The present invention covers such embodiments and various variations falling within the scope and spirit of the present invention.

Figure 1:
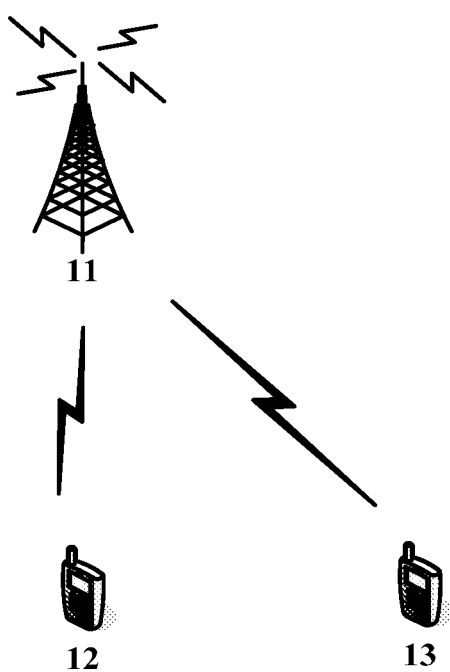
FIG. 1 illustrates one typical application scenario for the present invention.

FIG. 1 shows a one application scenario for at least one the embodiment of the present invention, wherein, there is shown a management device 11, for example an eNodeB referred to as base station 11 hereinafter, in LTE-A network is shown, additionally, two UEs are briefly illustrated, wherein UE 12 employs two antennas, referred to be as dual-antenna UE, UE 13 employs four antennas, referred to be as quadri-antenna UE. With reference to the description for UE 12, 13 hereinafter, those skilled in the art may apply the present invention to other UE and management device not shown in the figure. Explanation for method, device of those embodiments according to the present invention will be made with every Network Element shown in FIG. 1 centered around.

Figure 2:
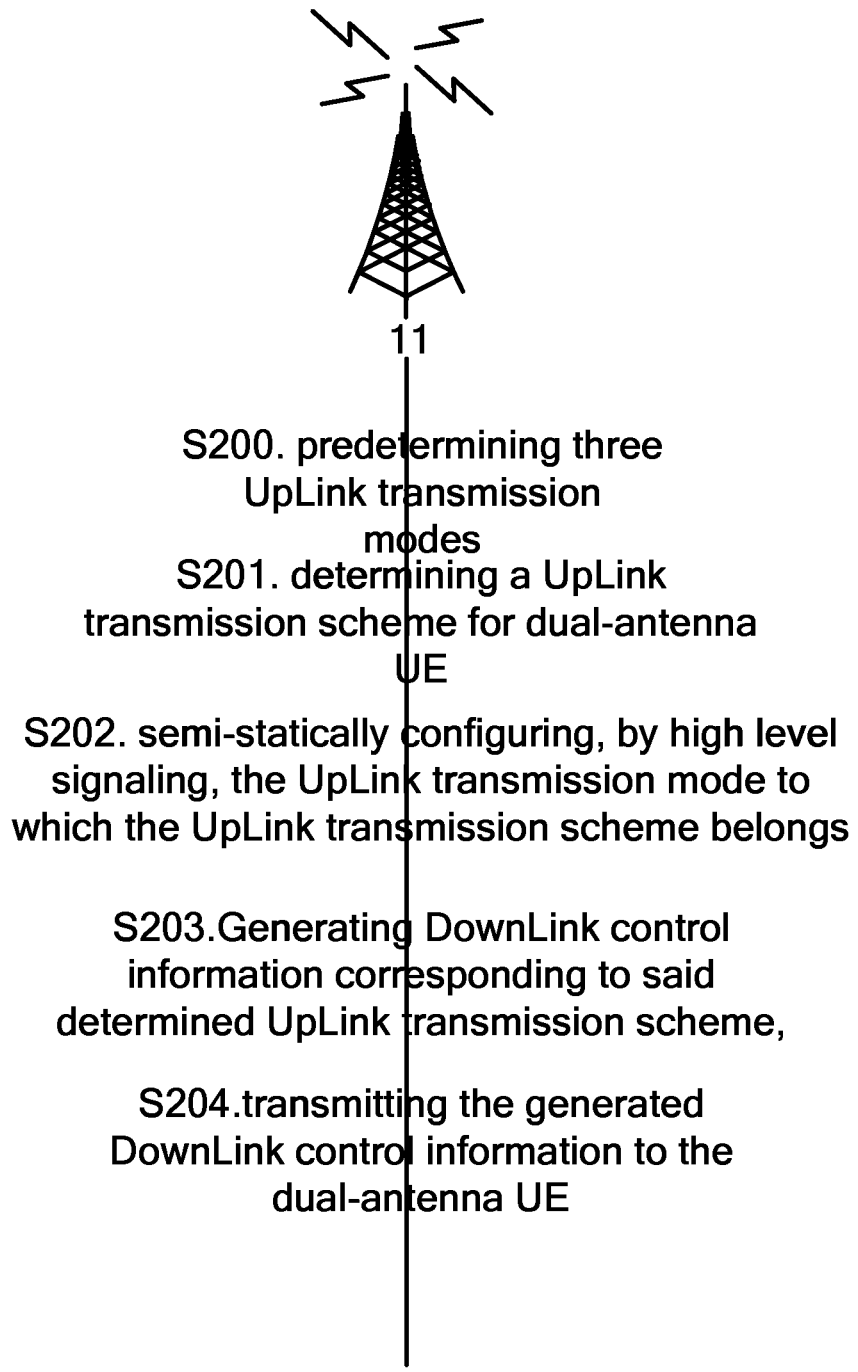
FIG. 2 illustrates a flowchart of a method of providing, for a dual-antenna UE, downlink control information used for uplink transmission in a management device of enhanced LTE network according to one embodiment of the present invention.

With reference to FIG. 2, a flowchart of a method of providing, for a dual-antenna UE, downlink control information used for uplink transmission in a management device of enhanced LTE network according to one embodiment of the present invention is illustrated. In step S200, Base station 11 determines three uplink transmission schemes for dual-antenna UE, as shown specifically in Table 2.

UL transmission mode 1 (UL TM1) is configured for single-antenna port scheme with contiguous or non-contiguous RA, where only one type of DCI format, namely DCI format 0 is included. If DCI format 0 has not CIF, it could be allocated in common search space; otherwise, it is allocated in UE-specific search space.

TABLE 2

| PDCCH and PUSCH for 2-Tx configured by C-RNTI | | | |
|---|---|---|---|
| UL Transmission mode | DCI format | Search Space | Transmission scheme of PUSCH corresponding to PDCCH |
| UL Mode 1 | DCI format 0 | Common and UE specific by C-RNTI | Single-antenna port without/with CIF, contiguous or non-contiguous RA |
| UL Mode 2 | DCI format 0 | Common and UE specific by C-RNTI | Single-antenna port without/with CIF, contiguous or non-contiguous RA |
| | DCI format 0D | UE specific by C-RNTI | Closed-loop spatial multiplexing with up to two CWs and CIF, contiguous or non-contiguous RA |
| UL Mode 3 | DCI format 0 | Common and UE specific by C-RNTI | Single-antenna port without/with CIF, contiguous or non-contiguous RA |
| | DCI format 0B | Common and UE specific by C-RNTI | Closed-loop spatial multiplexing with single layer and CIF, contiguous or non-contiguous RA |

Wherein, after determining the corresponding uplink transmission schemes in step S201, in step S202, semi-statically configure, by high level signaling, the uplink transmission mode to which the uplink transmission scheme belongs, and in step S203, the downlink control information generated for single-port transmission to be performed by dual-antenna UE 12 has a format of downlink control information with a numbering of 0; yet if dual-antenna UE 12 is due to conduct a closed-loop spatial multiplexing transmission with up to two codewords, then the format of downlink control information (marked as Dar format 0D) generated in step S203, may be as Table 3:

TABLE 3

Message Contents of DCI Format 0D for 2-Tx and DCI Format 0C for 4-Tx

| | DCI Format 0D for 2-Tx Number of bits | | DCI Format 0C for 4-Tx Number of bits | |
|---|---|---|---|---|
| Contents | 2-TB | 1-TB enabled | 2-TB | 1-TB enabled |
| UL/DL format differential flag | 0 or 1 | 0 or 1 | 0 or 1 | 0 or 1 |
| RB assignment and hopping information | $N_{RA}$ | $N_{RA}$ | $N_{RA}$ | $N_{RA}$ |
| TBDI | 1 (TBDI = 1) or FFS | 1 (TBDI = 0) or FFS | — | — |
| TB to CW swap flag | 1 | 1 | 1 | 1 |
| MCS and RV for $1^{st}$ TB | 5 | 5    3: PMI reserved | 5 | 5    5: PMI |
| NDI for $1^{st}$ TB | 1 | 1 | 1 | 1 |
| MCS and RV for $2^{nd}$ TB | 5 | 3:PMI    5 reserved | 5 | 5:PMI    5 |
| NDI for $2^{nd}$ TB | 1 | 1 | 1 | 1 |
| PMI | — | — | 5 or 6 | 5 or 6 |
| TPC | 2 | 2 | 2 | 2 |
| Primary CS for CW0 | 3 | 3 | 3 | 3 |
| Secondary CS for CW1 | 3 or FFS | reserved | 3 or FFS | reserved |
| UL index (TDD only) | 2 | 2 | 2 | 2 |
| CQI request | 1 | 1 | 1 | 1 |
| SRS request | 1 | 1 | 1 | 1 |
| CIF | 3 | 3 | 3 | 3 |
| CRC | 16 | 16 | 16 | 16 |
| Total Size | ($N_{RA}$ + 44) for FDD | | ($N_{RA}$ + 48 or 49) for FDD | |

As shown in Table 3, DCI format 0D comprises first indicating field and second indicating field, which specifically may be implemented respectively by transmission block disabling indicating field and TB-codeword mapping indicating field, and further comprises a first transmission block, for example new-data indicating field for CW0 and a second transmission block, for example the new-data indicating field for CW1.

Wherein, when transmission block disabling function is adopted in the determined uplink transmission scheme, disablement of at least one of two transmission blocks is represented by a first combination of the values of the transmission block disabling indicating field and the TB-codeword mapping indicating field; and the disabled transmission block of the two transmission blocks is represented by a combination formed by the new-data indicating field for the first transmission block and the new-data indicating field for the second transmission block.

Still as shown in Table 3, when one-codeword retransmission is used in the determined uplink transmission scheme, the one-codeword retransmission, of one transmission block of the both transmission blocks transmitted last time, is represented by a second combination formed by the values of the transmission block disabling indicating field and the TB-codeword mapping indicating field, and the transmission block, for the one-codeword retransmission, of the both transmission blocks is represented by the combination formed by the new-data indicating field for a first transmission block and the new-data indicating field for a second transmission block.

Moreover, as shown in Table 3, DCI format 0D further comprises the respective redundant versions of modulation-coding modes of the two transmission blocks, at least part of the redundant version of modulation-coding mode of the other transmission block, other than the transmission block for the one-codeword retransmission, of the two transmission blocks is utilized to represent pre-coding matrix indicating information of channel coding codeword which is mapped by the transmission block for the one-codeword retransmission, so as to replace precoding matrix indicating field. In other word, in DCI format 0D, PMI field may be unnecessary.

In step S204, generated downlink control information would be transmitted to dual-antenna UE 12.

Figure 3:
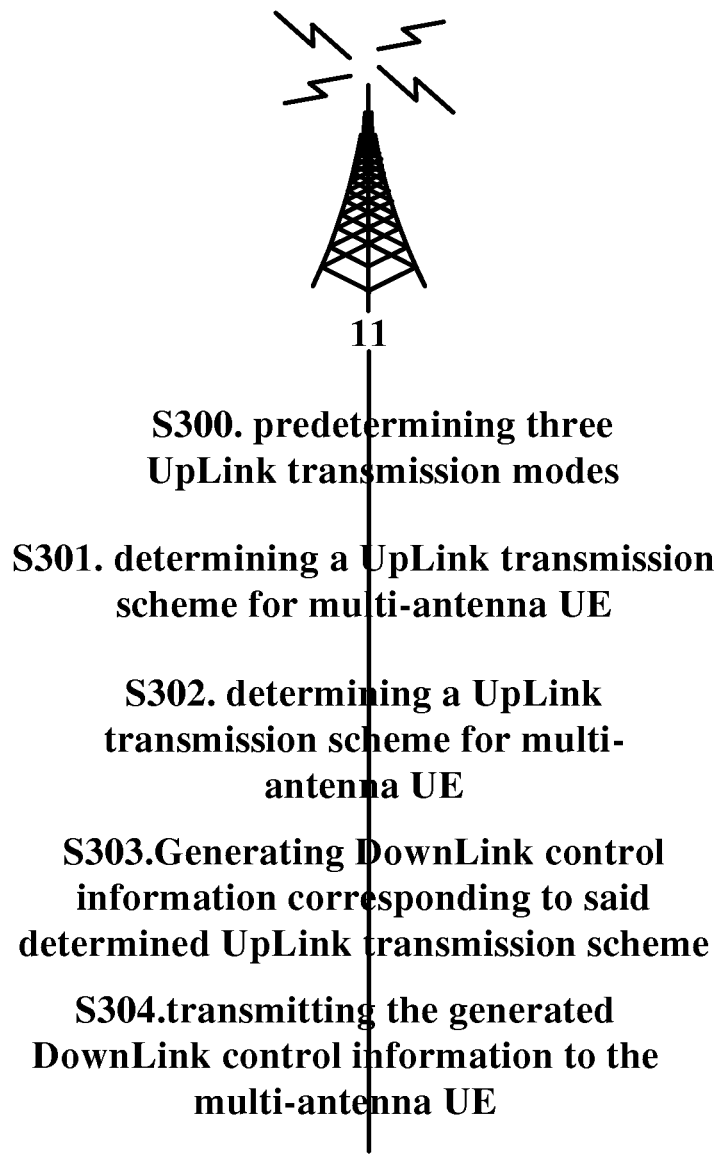
FIG. 3 illustrates a flowchart of a method of providing, for a multi-antenna UE, downlink control information used for uplink transmission in a management device of enhanced LTE network according to one embodiment of the present invention.

With reference to FIG. 3, there is illustrated a flowchart of a method of providing, for a quadri-antenna UE, downlink control information used for uplink transmission in a management device of enhanced LTE network according to one embodiment of the present invention. First, in step S300, three uplink transmission modes are predetermined, which are respectively: a first uplink transmission mode, a second uplink transmission mode and a third uplink transmission mode, as shown in Table 4:

TABLE 4

PDCCH and PUSCH for 4-Tx configured by C-RNTI

| UL Transmission mode | DCI format | Search Space | Transmission scheme of PUSCH corresponding to PDCCH |
|---|---|---|---|
| UL Mode 1 | DCI format 0 | Common and UE specific by C-RNTI | Single-antenna port without/with CIF, contiguous or non-contiguous RA |
| UL Mode 2 | DCI format 0 | Common and UE specific by C-RNTI | Single-antenna port without/with CIF, contiguous or non-contiguous RA |
| | DCI format 0C | UE specific by C-RNTI | Closed-loop spatial multiplexing with up to two CWs and CIF, contiguous or non-contiguous RA |

TABLE 4-continued

PDCCH and PUSCH for 4-Tx configured by C-RNTI

| UL Transmission mode | DCI format | Search Space | Transmission scheme of PUSCH corresponding to PDCCH |
|---|---|---|---|
| UL Mode 3 | DCI format 0 | Common and UE specific by C-RNTI | Single-antenna port without/with CIF, contiguous or non-contiguous RA |
|  | DCI format 0B | Common and UE specific by C-RNTI | Closed-loop spatial multiplexing with single-layer and CIF, contiguous or non-contiguous RA |

Wherein, in Table 4, the first uplink transmission mode corresponds to transmission of single-antenna port. The second uplink transmission mode corresponds to transmission of single-antenna port or closed-loop spatial multiplexing transmission with up to two codewords. The third uplink transmission mode corresponds to transmission of single-antenna port or closed-loop spatial multiplexing transmission with single layer.

Wherein, after determining a corresponding transmission scheme in step S301, in step S302, semi-statically configures, by high level signaling, the uplink transmission mode to which the uplink transmission scheme belongs. Subsequently, in step S303, the downlink control information generated for single-port transmission to be performed by multi-antenna UE, for example quadri-antenna UE 13, has a format of downlink control information with a numbering of 0; yet if quadri-antenna UE 13 is due to conduct a closed-loop spatial multiplexing transmission with up to two codewords, then the format of downlink control information generated in step S303 will be as shown in Table 3.

Wherein, when transmission block disabling function is adopted in the determined uplink transmission scheme, disablement of at least one of two transmission blocks is represented by a first value, for example the value of 30 in binary form, of the precoding matrix indicating field; and the disabled transmission block of the two transmission blocks is represented by a combination of the new-data indicating field for the first transmission block and the new-data indicating field for the second transmission block.

The downlink control information, in the form of DCI format 0C, further comprises a TB-codeword mapping indicating field and respective redundant version fields of modulation-coding modes of the two transmission blocks, wherein, the redundant version field of modulation-coding mode of the disabled transmission block and the TB-codeword mapping indicating field are utilized to collaboratively represent the pre-coding matrix information of channel coding codeword which is mapped by the transmission block without being disabled.

When one-codeword retransmission is used in the determined uplink transmission scheme, the one-codeword retransmission, of one transmission block of the both transmission blocks transmitted last time, is represented by a second value, for example the value of 31 in binary form, of the precoding matrix indicating field; and the transmission block, with the one-codeword retransmission conducted thereon, of the both transmission blocks transmitted last time is represented by the combination formed by the new-data indicating field for a first transmission block and the new-data indicating field for a second transmission block.

Wherein, the redundant version field of modulation-coding mode of the transmission block, without the one-codeword retransmission conducted, and the TB-codeword mapping indicating field collaboratively represent the pre-coding matrix of channel coding codeword which is mapped by the transmission block for the one-codeword retransmission.

In step S304, the generated downlink control information is transmitted to the quadri-antenna UE.

The optimized DCI format 0D and 0C, with different size, is designed for case of two antennas and 4 antennas, with dynamic rank adaptation and 1-CW retransmission supported. Different from downlink transmission, antennas configuration of quadri-antenna UE and dual-antenna UE of uplink transmission has a high dependency of capability of UE. For 2-Tx, the precoding of 2-CW transmission is an identity matrix due to its full-rank transmission. As a result, the PMI field is unnecessary for DCI format 0D. While for 4-Tx, the precoding of 2-CW transmission may not be full-rank so that 5 to 6 bits PMI are needed. As detailed in Section 3, there are at least 4-bit payload difference between DCI format 0C and 0D.

As abovementioned, according to one embodiment of the present invention, separate DCI formats with different sizes may be specified for 2-Tx and 4-Tx antenna UE, for example, the aforesaid DCI format 0D and DCI format 0C.

In UL transmission mode 3 (UL TM3), DCI format 0B is configured for multiple-antenna ports with single-layer transmission, which could be applicable for UL MU-MIMO and beamforming. Since DCI format OB needs to indicate the information for one TB only, then for 2-Tx there are at least 5-bit payload difference between DCI format 0B and 0D while 7-bit difference in payload between DCI format 0B and 0C.

According to one preferable embodiment of the present invention, an additional RRC-configured UL transmission mode for single-layer transmission scheme is specified, i.e., UL TM3 in table 2-3.

Since DCI format 0 is configured for all these three transmission modes, dynamic fallback to single-antenna port scheme is supported.

Hereinafter, further description will be made for the above various UL DCI formats. Wherein, several agreements mentioned in the background are also taken into account. And following description aims partially at every field in the DCI format.

RB (Resource Block) Assignment and Hopping Information

The hopping flag in DCI format 0 could be used for RB assignment in case of non-contiguous RA. Although the number of clusters is still open, the following two options could be provided alternatively:

Scheme 1: 2 clusters (with UL DCI format aligned with DCI format 0)

Scheme 2: Number of clusters not limited by the signalling (with UL DCI format aligned with configured DL DCI formats)

According to one embodiment of the present invention, for the above scheme 1, UL DCI format RA field is aligned with DCI format 0 in terms of RA. Accordingly, the number of bits in this RA field could be given by $$N_{RA} = \log_2(N_{RB}^{UL}(N_{RB}^{UL}+1)/2)+1 \quad (1)$$

UL Per-antenna/Per-CW Power Control

According to one preferable embodiment of the present invention, by an extension of Rel-8 UL power control to the case of UL multiple-antenna ports without impacts on the existing single TPC command, thereby, the control signalling overhead is reduced as more as possible.

CS Configuration for Multiple Layers

Although CS separation is the primary multiplexing scheme of DM RS, wherein the CS configuration could be predefined, or semi-static indicated by RRC signaling or dynamically indicated. If it is agreed that PHICH resources for CW0 and CW1 of UL MIMO are identified by the associated CS index values, dynamic configuration of CS for multiple layers is a little preferred with better performance from the viewpoint of avoiding PHICH resource collision.

Some Dedicated Definitions About DCI Format 0D

1. Necessity of PMI Field

As specified in TS36.211 [4] for LTE Rel-8 DL spatial multiplexing, the case of a single CW mapped to two layers is only applicable when the number of antenna ports is 4. The same CW-to-layer mapping principle is reused for LTE-A Rel-10 UL spatial multiplexing. For 2-Tx, full-rank transmission with two layers is only mapped from two CWs. Considering that the precoding of full-rank transmission is an identity matrix as described in TR36.814, the PMI field in Dar format 0D for up to 2-TB is unnecessary.

2. TB Disabling Indication

To support dynamic rank adaptation, new DCI formats for up to 2-TB have to support the scheduling of 1-TB enabled. Unlike in the LTE Rel-8 DL, UL MCS and RV are jointly signaled in LTE-A Rel-10, so that transmission block disabling can not be indicated by a special combination of MCS=0 and RV=1 as in Rel-8 DL grant. Consequently, according to one embodiment of the present invention, an additional bit is introduced for indication of such content, which may be named as a first indicating field and often occupy 1 bit. In addition, for the transmission or retransmission with only one TB, the enabled TB could be always mapped to the first codeword, for example CW0, which is as like as the case in LTE Rel-8 DL. According to one embodiment of the present invention, the TB-to-CW swap flag (Swap) could be used to differentiate TB disabling and 1-CW retransmission functions. For example, for the case of adoption of the TB disabling function, DCL format 0D could be designed based on the following:

If TBDI=0 and Swap=0, at least one of the two TBs is disabled. Moreover, the NDI for respective TB could be used to indicate the disabled transmission block is disabled. E.g.:

(1) If the new-data indicating field (NDI1) of the first transmission block equals 1, the new-data indicating field (NDI2) of the second transmission block equal 0, it is denoted that TB1 is enabled and TB2 is disabled;
(2) NDI1=0 and NDI 2=1 denotes TB1 is disabled and TB2 is enabled;
(3) NDI 1=0, NDI 2=0 and CQI request=1/SRS request=1 denotes both TBs are disabled while aperiodic CQI and/ or aperiodic SRS are transmitted.

Wherein, the enabled TB is always mapped to CW0, Then 3-bit out of the MCS and RV field corresponding to the disabled TB could be used to indicate the precoding matrix of enabled TB, so as to functionally replace precoding matrix indicating field of the enabled transmission block, and the remaining 2 bits may be reserved.

3. 1-CW Retransmission

If TBDI=0 and Swap=1, one of the two TBs, transmitted last time, is to be retransmitted and the other TB is terminated.

Furthermore, the NDI for respective TB could be used to indicate which TB is due to conduct the 1-codeword retransmission, i.e., (1) NDI 1=0 and NDI 2=1 denotes only TB1 is to be retransmitted;
(2) NDI 1=1 and NDI 2=0 denotes only TB2 is to be retransmitted;

wherein, the transmission block for 1-codeword retransmission is always mapped to CW0, then 3-bit out of the MCS and RV field corresponding to the terminated TB could be used to indicate the precoding matrix of the transmission block for 1-codeword retransmission and the remaining 2 bits are reserved.

Some Dedicated Definition About DCI Format OC

1. PMI Field

For spatial multiplexing with 2-TB, the transmission ranks is not less than 2. The total number of precoding matrices for rank-2, rank-3 and rank-4 is 29. Therefore, 5-bit PMI is sufficient for representation of 2-TB transmission. However, 6-bit PMI field could be also defined to potentially support possible new codebook 2. TB (Transmission Block) Disabling Indication Even in the case of using 5-bit PMI field, there are 3 redundant indices for reservation. So, one reserved index could be used to represent the active TB disabling function with another one reserved index denoting adoption of 1-CW retransmission function. For example:

If PMI index, IPMI=30, then at least one of the two TBs is disabled.

The NDI for respective TB could be used to further indicate its corresponding TB is disabled. E.g., (1) NDI 1=1 and NDI2=0 denotes TB1 is enabled and TB2 is disabled;
(2) NDI 1=0 and NDI2=1 denotes TB1 is disabled and TB2 is enabled;
(3) NDI 1=0, NDI 2=0 and CQI request=1/SRS request=1 denotes both TBs are disabled while aperiodic CQI and/or aperiodic SRS are transmitted Wherein, the enabled TB(s) is always mapped to CW0.

Other meaning, different from precoding matrix, may be represented if value of PMI field is set, for example to be 30, 31. Therefore, the combination of 1-bit TB-to-CWmapping indication and 5-bit MCS and RV field corresponding to the disabled TB could be used to indicate the precoding matrix of the enabled transmission block, which may indicate up to 64 precoding matrixes.

3. 1-CW Retransmission Indication

For example, if PMI index, IPMI=31 (in binary mode), one of the two TBs, transmitted last time, is to be retransmitted. The NDI for respective TB could be further used to indicate the TB due to conduct the 1-CW retransmission, i.e., (1) NDI 1=0 and NDI 2=1 denotes only TB1 is to be retransmitted;
(2) NDI 1=1 and NDI 2=0 denotes only TB2 is to be retransmitted;

wherein, the transmission block for 1-CW retransmission is always mapped to CW0. Other meaning, different from precoding matrix, may be represented if value of PMI field is set, for example to be 30, 31. Therefore, the combination of 1-bit TB-to-CW mapping indicating field and 5-bit MCS and RV field of TB without 1-CW retransmission loaded could be used to indicate the precoding matrix of the enabled transmission block for 1-CW codeword retransmission, which may indicate up to 64 precoding matrixes.

Some Dedicated Definition About DCI Format 0B

DCI format 0B may be designed for 2-antenna and 4-antenna UE and of which the content is as shown in Table 5, and different from DCI format 0D and 0C, the fields for TB-to-CW swap, MCS and RV, as well as CS field of DM RS for second CW are may be omitted in DCI format 0B. Since there are 6 precoding vectors for single-layer transmission for 2-Tx and 24 precoding vectors for 4-Tx, the PMI field may be designed to have 3-bit for 2-Tx and 5-bit for 4-Tx, respectively.

TABLE 5 content for DCI format OB

| Contents | Number of bits | |
| --- | --- | --- |
| | 2-Tx | 4-Tx |
| UL/DL format differential flag | 0 or 1 | 0 or 1 |
| RB assignment and hopping information | $N_{RA}$ | $N_{RA}$ |
| MCS and RV | 5 | 5 |
| NDI | 1 | 1 |
| PMI | 3 | 5 |
| TPC | 2 | 2 |
| CS for DMRS | 3 | 3 |
| UL index (TDD only) | 2 | 2 |
| CQI request | 1 | 1 |
| SRS request | 1 | 1 |
| CIF | 3 | 3 |
| CRC | 16 | 16 |
| Total Size | ($N_{RA}$ + 36) for FDD | ($N_{RA}$ + 38) for FDD |

Figure 4:
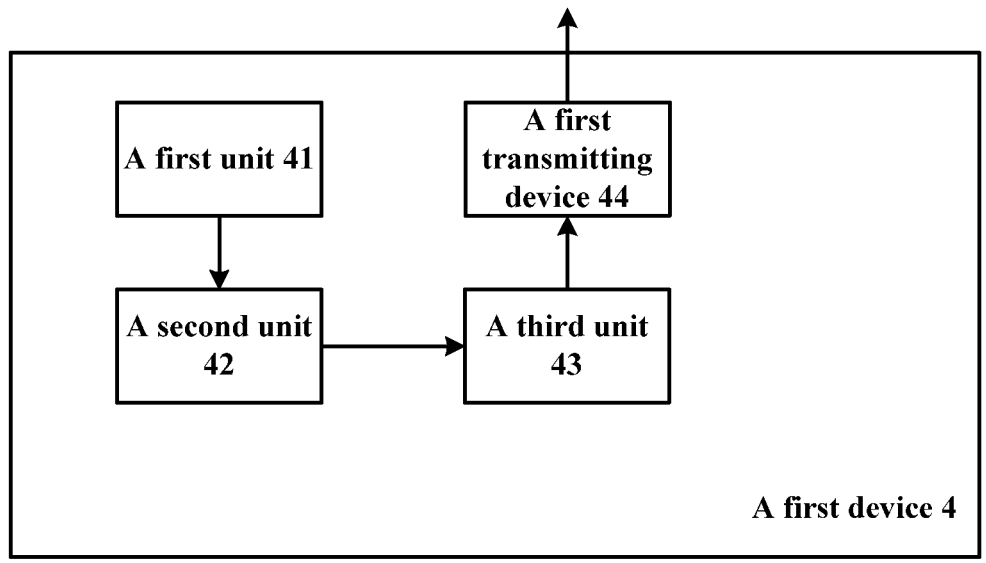
FIG. 4 illustrates a function block diagram of a first device of providing, for a dual-antenna UE, downlink control information used for uplink transmission in a management device of enhanced LTE network according to one embodiment of the present invention.

With Reference to FIG. 4, wherein there is illustrated a function block diagram of a first device 4 of providing, for a dual-antenna UE, downlink control information used for uplink transmission in a management device of enhanced LTE network, the first device 4 is typically located in base station 11 shown in FIG. 1, and comprises:

a first unit 41 for determining an uplink transmission scheme for the dual-antenna UE, which corresponds to Step S201 as shown in FIG. 2;

a second unit 42 for semi-statically configuring, by high level signaling, the uplink transmission mode to which the uplink transmission scheme belongs, which corresponds to Step S202 as shown in FIG. 2;

a third unit 43 for generating downlink control information corresponding to the determined uplink transmission scheme, the downlink control information comprising a first indicating field, a second indicating field, a new-data indicating field for a first transmission block and a new-data indicating field for a second transmission block, which corresponds to Step S203 as shown in FIG. 2;

Wherein, when transmission block disabling function is adopted in the determined uplink transmission scheme, disablement of at least one of two transmission blocks is represented by a first combination of the values of the first indicating field and the second indicating field; and the disabled transmission block of the two transmission blocks is represented by a combination formed by the new-data indicating field for the first transmission block and the new-data indicating field for the second transmission block;

a first transmitting device 44 for transmitting the generated downlink control information to the dual-antenna UE, which corresponds to Step S204 as shown in FIG. 2.

Moreover, the downlink control information further comprises respective redundant versions of modulation-coding modes of the two transmission blocks; when a transmission block is disabled in the determined uplink transmission scheme, at least part of the redundant version for modulation-coding mode of the disabled transmission block is utilized to represent pre-coding matrix indicating information of channel coding codeword which is mapped by the transmission block without being disabled, so as to replace precoding matrix indicating field; or, When one-codeword retransmission is used in the determined uplink transmission scheme, the one-codeword retransmission, of one transmission block of the both transmission blocks transmitted last time, is represented by a second combination formed by the values of the first indicating field and the second indicating field, and the transmission block, for the one-codeword retransmission, of the both transmission blocks is represented by the combination formed by the new-data indicating field for a first transmission block and the new-data indicating field for a second transmission block.

And still furthermore, the downlink control information further comprises respective redundant versions for modulation-coding modes of the two transmission blocks, at least part of the redundant version for modulation-coding mode of the other transmission block, other than the transmission block for the one-codeword retransmission, of the two transmission blocks is utilized to represent pre-coding matrix indicating information of channel coding codeword which is mapped by the transmission block for the one-codeword retransmission, so as to replace precoding matrix indicating field.

Figure 5:
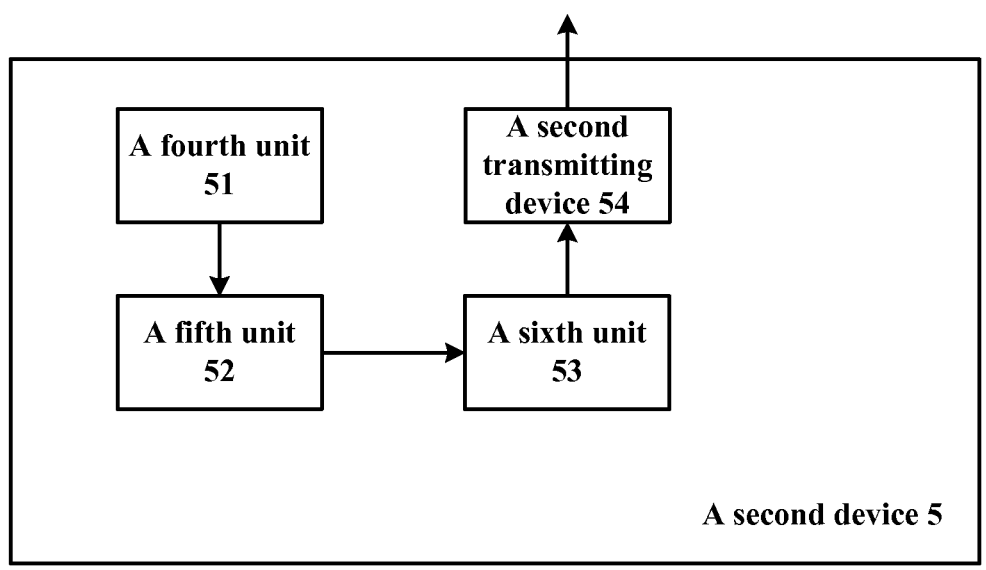
FIG. 5 illustrates a function block diagram of a second device of providing, for a multi-antenna UE, downlink control information used for uplink transmission in a management device of enhanced LTE network according to one embodiment of the present invention.

With reference to FIG. 5, wherein there is illustrated a function block diagram of a second device 5 of providing, for a quadri-antenna UE, downlink control information used for uplink transmission in a management device of enhanced LTE network, the second device 5 is typically located in base station 11, and comprises:

a fourth unit 51 for determining an uplink transmission scheme for the quadri-antenna UE which corresponds to Step S301 as shown in FIG. 3;

a fifth unit 52 for semi-statically configuring, by high level signaling, the uplink transmission mode to which the uplink transmission scheme belongs, which corresponds to Step S302 as shown in FIG. 3;

a sixth unit 53 for generating downlink control information corresponding to the determined uplink transmission scheme, the downlink control information comprising a precoding matrix indicating field, and further comprising a new-data indicating field for a first transmission block and a new-data indicating field for a second transmission block, which corresponds to Step S303 as shown in FIG. 3;

Wherein, when transmission block disabling function is adopted in the determined uplink transmission scheme, disablement of at least one of two transmission blocks is represented by a first value, for example 30 in binary form, of the precoding matrix indicating field; and the disabled transmission block of the two transmission blocks is represented by a combination of the new-data indicating field for the first transmission block and the new-data indicating field for the second transmission block;

the downlink control information further comprises a TB-codeword mapping indicating field and respective redundant version fields of modulation-coding modes of the two transmission blocks, wherein, the TB-codeword mapping indicating field and the redundant version field of modulation-coding mode of the disabled transmission block collaboratively represent the pre-coding matrix of channel coding codeword which is mapped by the transmission block without being disabled;

a second transmitting device 54 for transmitting the generated downlink control information to the multi-antenna UE, which corresponds to Step S304 as shown in FIG. 3.

Moreover, when one-codeword retransmission is used in the determined uplink transmission scheme, the one-codeword retransmission, of one transmission block of the both transmission blocks, is represented by a second value, for example 31 in binary form, of the precoding matrix indicating field; and the transmission block, with the one-codeword retransmission conducted thereon, of the both transmission blocks is represented by the combination formed by the new-data indicating field for a first transmission block and the new-data indicating field for a second transmission block;

wherein, the TB-codeword mapping indicating field and the redundant version field of modulation-coding mode of the transmission block, without the one-codeword retransmission conducted, collaboratively represent the pre-coding matrix of channel coding codeword which is mapped by the transmission block for the one-codeword retransmission.

For those skilled in the art, it is apparent that the present invention is not limited to the details of above exemplary embodiments, and the present invention may be carried out in other specific form without departing from the basic feature or spirit of the present invention. Therefore, anyway, the embodiments should be deemed to be exemplary and non-limited, the scope of the present invention is defined by appended claims instead of the above description, thereby with the intention that all the variations falling within the meaning and scope of the equivalent of claims are construed to be within the coverage of the present invention. None of the Figure numbers in the claims should be deemed as a limitation to the relevant claim(s). Additionally, apparently, the word of "comprise" does not exclude the existence of other unit, and the case of singular number does not exclude the case of plural number. Such word as 'a first', 'a second', is merely used for representing a name, instead of particular order.

What is claimed is:

1. A method of providing, for a dual-antenna UE, downlink control information used for uplink transmission in a management device of LTE-A network, the method comprising:
   determining an uplink transmission scheme for said dual-antenna UE;
   semi-statically configuring, by high level signaling, an uplink transmission mode to which said uplink transmission scheme belongs;
   generating downlink control information corresponding to said determined uplink transmission scheme, said downlink control information comprising a first indicating field, a second indicating field, a new-data indicating field for a first transmission block and a new-data indicating field for a second transmission block;
   wherein, when transmission block disabling function is adopted in said determined uplink transmission scheme, a first combination formed by the values of said first indicating field and said second indicating field is used to represent disablement of at least one of two transmission blocks; and a combination formed by said new-data indicating field for said first transmission block and said new-data indicating field for said second transmission block is used to represent the disabled transmission block of said two transmission blocks;
   transmitting said generated downlink control information to said dual-antenna UE.

2. The method according to claim 1, wherein, said downlink control information further comprises respective redundant versions of modulation-coding modes of said two transmission blocks; when a transmission block is disabled in the determined uplink transmission scheme, at least part of the redundant version of modulation-coding mode of said disabled transmission block is utilized to represent pre-coding matrix indicating information of channel coding codeword which is mapped by the transmission block without being disabled, so as to replace a precoding matrix indicating field.

3. The method according to claim 1, wherein, when one-codeword retransmission is used in said determined uplink transmission scheme, a second combination formed by the values of said first indicating field and said second indicating field is used to represent the one-codeword retransmission of one transmission block of the two transmission blocks transmitted last time, and the combination formed by said new-data indicating field for said first transmission block and said new-data indicating field for said second transmission block is used to represent the transmission block, with said one-codeword retransmission conducted thereon, of said two transmission blocks.

4. The method according to claim 3, wherein, said downlink control information further comprises respective redundant versions of modulation-coding modes of said two transmission blocks, at least part of the redundant version of modulation-coding mode of the other transmission block, other than said transmission block with said one-codeword retransmission conducted, of said two transmission blocks is utilized to represent pre-coding matrix indicating information of channel coding codeword which is mapped by said transmission block with said one-codeword retransmission conducted, so as to replace a precoding matrix indicating field.

5. A method of providing, for a multi-antenna UE, downlink control information used for uplink transmission in a management device of LTE-A network, the method comprising:
   determining an uplink transmission scheme for said multi-antenna UE;
   semi-statically configuring, by high level signaling, the uplink transmission mode to which said uplink transmission scheme belongs;
   generating downlink control information corresponding to said determined uplink transmission scheme, said downlink control information comprising a precoding matrix indicating field, and further comprising a new-data indicating field for a first transmission block and a new-data indicating field for a second transmission block;
   wherein, when transmission block disabling function is adopted in said determined uplink transmission scheme, a first value of said precoding matrix indicating field is used to represent disablement of at least one of two transmission blocks; and a combination of said new-data indicating field for said first transmission block and said new-data indicating field for said second transmission block is used to represent the disabled transmission block of said two transmission blocks;
   said downlink control information further comprises respective redundant version fields of modulation-coding modes of said two transmission blocks, wherein, the redundant version field of modulation-coding mode of said disabled transmission block is utilized to represent the pre-coding matrix information of channel coding codeword which is mapped by the transmission block without being disabled;

transmitting said generated downlink control information to said multi-antenna UE.

6. The method according to claim 5, wherein, when one-codeword retransmission is used in said determined uplink transmission scheme, a second value of said precoding matrix indicating field is used to represent the one- codeword retransmission of one transmission block of the two transmission blocks transmitted last time; and the combination formed by said new-data indicating field for said first transmission block and said new-data indicating field for said second transmission block is used to represent the transmission block, with said one- codeword retransmission conducted thereon, of said two transmission blocks;

wherein, the redundant version field of modulation-coding mode of said transmission block, without said one-codeword retransmission conducted, represents the pre-coding matrix of channel coding codeword which is mapped by the transmission block with said one-codeword retransmission conducted.

7. A method of providing, for a dual-antenna UE, downlink control information used for uplink transmission in a management device of LTE-A network, the method comprising:

determining an uplink transmission scheme for said dual-antenna UE;

semi-statically configuring, by high level signaling, the uplink transmission mode to which said uplink transmission scheme belongs;

generating downlink control information corresponding to said determined uplink transmission scheme, wherein, when said uplink transmission scheme is of a closed-loop spatial multiplexing transmission with up to two codewords, said downlink control information comprises:

a resource block assignment and hopping information field;

a transmission block disabling indicating field;

a TB-codeword mapping indicating field;

a redundant version field of modulation-coding mode of every transmission block;

a new-data indicating field of every transmission block;

a transmission power control field;

a cycle shift field for demodulation reference signal corresponding to a first channel coding codeword;

a CQI request field;

a SRS request field;

a CIF field;

an UL index field for TDD only;

a CRC field;

transmitting said generated downlink control information to said dual-antenna UE.

8. A method of providing, for a multi-antenna UE, downlink control information used for uplink transmission in a management device of LTE-A network, the method comprising:

determining an uplink transmission scheme for said multi-antenna UE;

semi-statically configuring, by high level signaling, the uplink transmission mode to which said uplink transmission scheme belongs;

generating downlink control information corresponding to said determined uplink transmission scheme, wherein, when said uplink transmission scheme is of a closed-loop spatial multiplexing transmission with up to two codewords, said downlink control information comprises:

a resource block assignment and hopping information field;

a precoding matrix indicating field;

a TB-codeword mapping indicating field;

a redundant version field of modulation-coding mode of every transmission block;

a new-data indicating field of every transmission block;

a transmission power control field;

a cycle shift field for demodulation reference signal corresponding to a first channel coding codeword;

a CQI request field;

a SRS request field;

a CIF field;

an UL index field for TDD only;

a CRC field;

transmitting said generated downlink control information to said multi-antenna UE.

9. A method of providing, for a multi-antenna UE, downlink control information used for uplink transmission in a management device of LTE-A network, the method comprising:

determining an uplink transmission scheme for said multi-antenna UE;

semi-statically configuring, by high level signaling, the uplink transmission mode to which said uplink transmission scheme belongs;

generating downlink control information corresponding to said determined uplink transmission scheme, wherein, when said uplink transmission scheme is of a closed-loop spatial multiplexing transmission with single layer, said downlink control information comprises:

a resource block assignment and hopping information field;

a precoding matrix indicating field;

a redundant version field of modulation-coding mode of every transmission block;

a new-data indicating field of every transmission block;

a transmission power control field;

a cycle shift field for demodulation reference signal corresponding to a channel coding codeword;

a CQI request field;

a SRS request field;

a CIF field;

an UL index field for TDD only;

a CRC field;

transmitting said generated downlink control information to said multi-antenna UE.

10. A method of controlling uplink transmission of a UE in a management device of LTE-A network, wherein, said method comprises:

predetermining three uplink transmission modes for said UE, said three uplink transmission mode comprising a first uplink transmission mode, a second uplink transmission mode and a third uplink transmission mode, wherein:

said first uplink transmission mode corresponds to single-antenna port transmission;

said second uplink transmission mode corresponds to single-antenna port transmission or closed-loop spatial multiplexing transmission with up to two codewords;

said third uplink transmission mode corresponds to single-antenna port transmission or closed-loop spatial multiplexing transmission with single layer;

when said UE is a dual-antenna UE, downlink control information provided for closed-loop spatial multiplexing transmission with up to two codewords to be conducted by said UE has a format; or when said UE is a multi-antenna UE other than dual-antenna UE, downlink control information provided for closed-loop spatial multiplexing transmission with up to two codewords to be conducted by said UE has a downlink control information format.

11. A first device of providing, for a dual-antenna UE, downlink control information used for uplink transmission in a management device of LTE-A network, the first device comprising:
a first unit for determining an uplink transmission scheme for said dual-antenna UE;
a second unit for semi-statically configuring, by high level signaling, the uplink transmission mode to which said uplink transmission scheme belongs;
a third unit for generating downlink control information corresponding to said determined uplink transmission scheme, said downlink control information comprising a first indicating field, a second indicating field, a new-data indicating field for a first transmission block and a new-data indicating field for a second transmission block;
wherein, when transmission block disabling function is adopted in said determined uplink transmission scheme, the disablement of at least one of two transmission blocks is represented by a first combination formed by the values of said first indicating field and said second indicating field; and the disabled transmission block of said two transmission blocks is represented by a combination formed by said new-data indicating field for said first transmission block and said new-data indicating field for said second transmission block;
a first transmitting device for transmitting said generated downlink control information to said dual-antenna UE.

12. The first device according to claim 11, wherein, said downlink control information further comprises respective redundant versions of modulation-coding modes of said two transmission blocks; when a transmission block is disabled in the determined uplink transmission scheme, at least part of the redundant version of modulation-coding mode of said disabled transmission block is utilized to represent pre-coding matrix indicating information of channel coding codeword which is mapped by the transmission block without being disabled, so as to replace a precoding matrix indicating field; or,
when one-codeword retransmission is used in said determined uplink transmission scheme, the one-codeword retransmission, of one transmission block of the two transmission blocks transmitted last time, is represented by a second combination formed by the values of said first indicating field and said second indicating field, and the transmission block, with said one-codeword retransmission conducted thereon, of said two transmission blocks is represented by the combination formed by said new-data indicating field for said first transmission block and said new-data indicating field for said second transmission block.

13. The first device according to claim 12, wherein, said downlink control information further comprises respective redundant versions of modulation-coding modes of said two transmission blocks, at least part of the redundant version of modulation-coding mode of the other transmission block, other than said transmission block with said one-codeword retransmission conducted, of said two transmission blocks is utilized to represent pre-coding matrix indicating information of channel coding codeword which is mapped by said transmission block with said one-codeword retransmission conduct, so as to replace a precoding matrix indicating field.

14. A second device of providing, for a quadri-antenna UE, downlink control information used for uplink transmission in a management device of LTE-A network, the second device comprising:
a fourth unit for determining an uplink transmission scheme for said quadri-antenna UE;
a fifth unit for semi-statically configuring, by high level signaling, the uplink transmission mode to which said uplink transmission scheme belongs;
a sixth unit for generating downlink control information corresponding to said determined uplink transmission scheme, said downlink control information comprising a precoding matrix indicating field, and further comprising a new-data indicating field for a first transmission block and a new-data indicating field for a second transmission block;
wherein, when transmission block disabling function is adopted in said determined uplink transmission scheme, disablement of at least one of two transmission blocks is represented by a first value of said precoding matrix indicating field; and the disabled transmission block of said two transmission blocks is represented by a combination of said new-data indicating field for said first transmission block and said new-data indicating field for said second transmission block;
said downlink control information further comprises respective redundant version fields of modulation-coding modes of said two transmission blocks, wherein, the TB-codeword mapping indicating field and the redundant version field of modulation-coding mode of said disabled transmission block collaboratively represent the pre-coding matrix of channel coding codeword which is mapped by the transmission block without being disabled;
a second transmitting device for transmitting said generated downlink control information to said multi-antenna UE.

15. The second device according to claim 14, wherein, when one-codeword retransmission is used in said determined uplink transmission scheme, the one-codeword retransmission, of one transmission block of the two transmission blocks transmitted last time, is represented by a second value of said precoding matrix indicating field; and the transmission block, with said one-codeword retransmission conducted thereon, of said two transmission blocks transmitted last time is represented by the combination formed by said new-data indicating field for said first transmission block and said new-data indicating field for said second transmission block;
wherein, the redundant version field of modulation-coding mode of said transmission block, without said one-codeword retransmission conducted, represents the pre-coding matrix of channel coding codeword which is mapped by the transmission block with said one-codeword retransmission conducted.

* * * * *